United States Patent [19]
Manning

[11] 3,742,807
[45] July 3, 1973

[54] LEVELING AND LOCKING PIN
[76] Inventor: Dan Manning, 2259 State Road 444, Deltona, Fla. 32763
[22] Filed: Feb. 3, 1972
[21] Appl. No.: 223,329

[52] U.S. Cl. ................................................. 85/5 R
[51] Int. Cl. ........................................... F16b 19/00
[58] Field of Search .................. 85/5 R, 3 S, 3 R, 85/3 K, 5 CP, 5 E, 5 M, 5 B, 66, 63; 24/211 P, 212, 211 M, 211 N; 151/6, 69

[56] References Cited
UNITED STATES PATENTS
| | | | |
|---|---|---|---|
| 589,607 | 9/1897 | Mills | 85/3 R X |
| 1,567,575 | 12/1925 | Cunningham | 85/3 S X |
| 1,584,851 | 5/1926 | Crone | 85/5 R X |
| 2,399,581 | 4/1946 | Spooner | 85/5 B X |
| 2,426,099 | 8/1947 | Hershowitz | 85/5 R X |
| 3,669,481 | 6/1972 | Bergmann | 85/3 S X |

FOREIGN PATENTS OR APPLICATIONS
458,491   9/1925   Germany ............................. 85/5 B Primary Examiner—Ramon S. Britts
Attorney—Anthony J. McNulty et al.

[57] ABSTRACT

A self-locking and leveling pin having a body portion and a handle-like leveling-head depending from one end of said body portion and locking members disposed on opposite sides of said body portion and longitudinally spaced-apart along the length of said body portion; said pin is used to provide temporary fastening and leveling means for holding in registered alignment the bolt holes of successive heavy metal structural elements, e.g., prefabricated beams, angles, fastening members and sheets.

1 Claim, 4 Drawing Figures

LEVELING AND LOCKING PIN

BACKGROUND OF THE INVENTION

1. Field of the Invention

This invention relates to a leveling and self-locking pin for holding together structural materials. The pin of this invention is particularly useful as a safe temporary-fastener for aligning the bolt or rivet holes of structural elements, such as beams and fastening angles and heavy metal sheets, such as iron and steel sheets used in structural applications. The pin of this invention enables a structural worker to erect structural elements in sequence, i.e., one piece after another, instead of putting a fastening pin through structural elements which are already in face-to-face contact relationship. The pin of this invention can also be used to lock in place first heavy sheet metal pieces while continuing to lock in place successive sheet metal pieces, and maintain the sheets in registered alignment.

The locking members of this pin are inherently resilient, i.e., they are swingable and adapted to normally extend outwardly beyond the surface of the shank-like body portion of the pin, and are compressible within suitable recesses provided for that purpose in said body portion.

In the assembly of various structures from metal sheets, plates and structural members, it is commonly the practice to temporarily secure the parts to be joined by fastneing pins or bolts which are passed through registering holes therein prior to when permanent fastening, such as riveting or welding, can be effected. Also, in various knockdown or temporary constructions, fasteners are desired which can be very readily and quickly applied in erecting a structure and removed with equal facility when the structure is to be dismantled.

This invention provides a fastener which is of a simple, relatively cheap, sturdy construction, which can be easily operated and which will exert a pressure to yieldingly hold the connected parts in close face-to-face contact, and at the same time keep the pin itself in a level position in register with the openings in the sheet. The chief field of utility for the pin will be for structures of varying sizes in which present types of fasteners for thin light sheets are inadequate, and such structures are not so heavy as to require threaded bolts even for temporary fastening. The essence of this invention is to provide a device of the character described herein which can be inserted through adjacent structural elements, align the bolt holes, and clamp to elements together temporarily until the permanent fastening bolts can be inserted upon either side of the bolt-hole apertures. When bolts are secured in other portions of the metal plates, the leveling and fastening pin can be removed and moved to another position.

2. Description of the Prior Art

The prior art disclosed various self-locking pins. For example, Crone, U. S. Pat. No. 1,584,851, discloses a self-locking pin for use in brake-lever mechanisms. Crone's pin extends through three thicknesses of metal; Crone's pin is equipped with locking members which are within a slot cut in the outer end of the pin and are pivoted together by a rivet extending transversely through the pin. The locking members of the Crone pin are provided with sockets to receive the ends of two interposed springs which are independent of each other and whose action is to press the pivoted locking members outwardly to their locking position. The Crone pin differs from the leveling and locking pin of this invention in that Crone's pin has an ordinary head which does not provide the required leveling, and his locking members are opposite each other and are not staggered. The conventional pin head used by Crone merely prevents his pin from traveling completely through the holes of the sheet-metal which are in register with each other.

Ballaz, U.S. Pat. No. 1,478,093, disclosed a threadless bolt having latches which swing inward when a piece of sheet-metal is passed over it and spring out behind the opening in said sheet-metal through which the pin was passed. Like Crone, Ballaz utilized a conventional head at one end of his pin merely to prevent it from traveling completely through the holes.

Nagin, U.S. Pat. No. 2,361,491, discloses a pin having a head on one end and means on the other end to restrain the pin against accidental movement. Nagin's pin differs from the leveling and self-locking pin of this invention in that Nagin's pin utilizes a conventional round head and it does not have staggered locking-members. The conventional round head utilized by Nagin does not provide the registering alignment which the handle-like leveling head of the pin of this invention provides.

SUMMARY OF THE INVENTION

The detachable, leveling and self-locking pin of this invention is a simple, inexpensive pin which secures various members of a structure together with their bolt holes in registered alignment. The pin of this invention comprises (1) a body portion, (2) a handle-like leveling-head on one end which restrains the pin against accidental displacement and maintains the pin and the bolt-holes in the structural members being fastened together by said pin in registered alignment, and (3) adjustable, resilient locking-members disposed in staggered series in longitudinally spaced-apart relationship on opposite sides of said body portion. The pin can be readily inserted in a fastening position and securely locked by the combination of the leveling head and the locking members against accidental displacement. When desired, the pin can be quickly and readily unlocked by manual depression of the locking-members, and then withdrawn from the fastening position. The pin of this invention enables a structural worker to erect one structural element at a time and do it safely, e.g., the first element is secured while the next element is being positioned.

The locking-memers of the pin extend from transverse recesses at the base of longitudinal slots in the body portion. The locking members serve to hold structural elements, such as beams, angles and metal plates, together. Such plates are provided with apertures of a size to snugly receive bolts or rivets. When the pin of this invention is inserted through such apertures, the locking-members will be swung inward by engagement with the walls of such apparatus, springing out behind the elements to hold them together. The locking-members may be spring-actuated so that a spring pushes the locking member outwardly from a slot in the body portion. It is preferred that the locking-members have forwardly tapered body portions and arms at their rear ends which are confined to a recess in the body-portion. The said arms engage the end-walls of the body-portion and have shoulders at the forward ends of said arms to extend laterally over the thickness of said end-walls. The said arms have main projections forwardly of said shoulders which said main projections have flat rear surfaces for presentation to the face of the adjacent structural element being fastened together. The structural element adjacent to the handle-like leveling head has face-to-face presentation with the flat surface of the leveling head which extends outwardly from the body portion of the pin to a substantially greater degree than a conventional head.

The handle-like leveling head of the pin may extend radially outward from the body portion, or downwardly at right angles therefrom, or arcuately outward from said body portion with its terminal end below and in vertical alignment with its starting point at the neck of the body portion from which it depends.

The longitudinal distances from the leveling head to the first locking-member and from the first to the second locking-member may be varied according to the thickness of the structural elements to be fastened together.

BRIEF DESCRIPTION OF THE DRAWINGS AND PREFERRED EMBODIMENTS

This invention will be more fully understood from the descriptions given above in the summary of the invention and hereinafter presented, reference being had to the accompanying drawings, in which.

Figure 2:
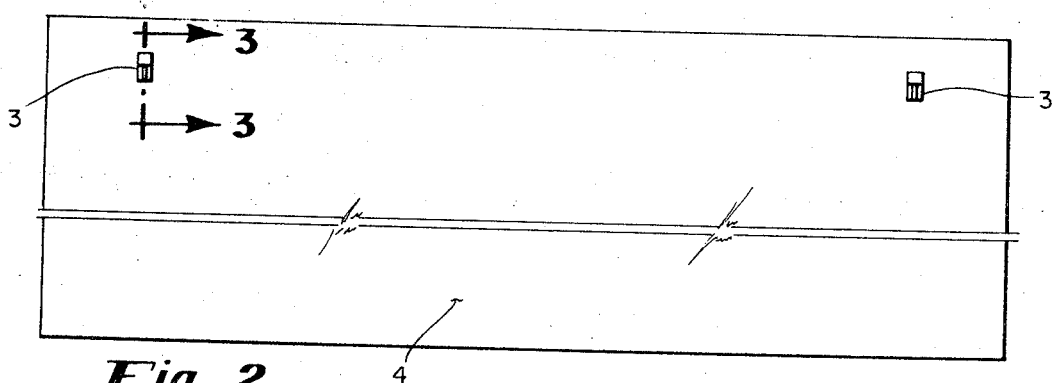
FIG. 2 is a frontal view of a structural element which has two leveling and self-locking pins 3 extending through apertures in such element for receiving bolts or rivets.
Figure 3:
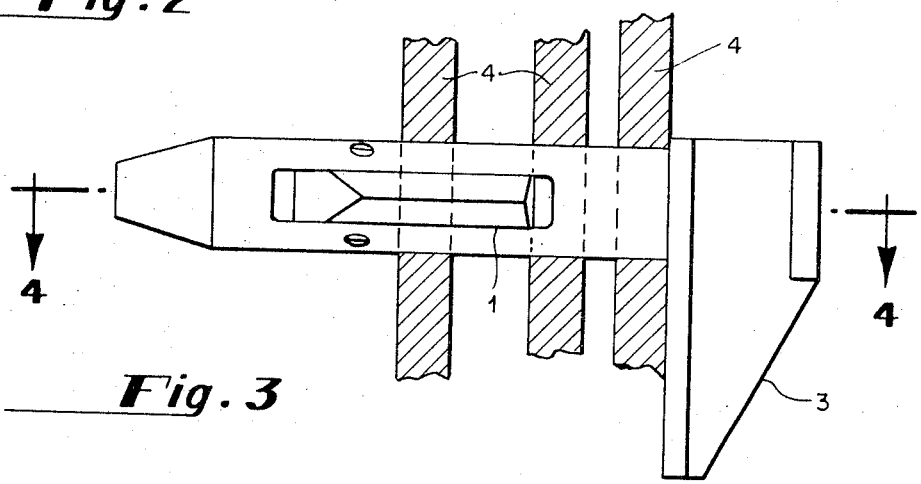
FIG. 3 is a sectional view through the sides of said elements, which are partly broken away, the section being taken on the dotted line 3—3 of FIG. 2.
Figure 4:
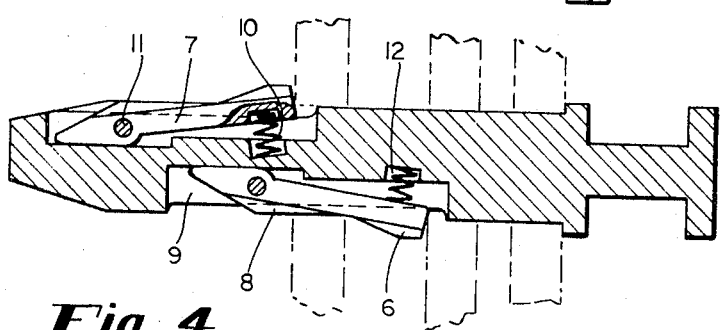
FIG. 4 is a sectional view through the tops of said elements and the leveling and self-locking pin, the section being taken on the dotted line 4—4 of FIG. 3.

In the drawings, 1 and 2 designate, self-locking members and 3 designates the handle-like leveling head of the pin 5. Projecting arms 7 have forwardly tapered locking members 6 and rearwardly tapered projections 8 which are housed in recess 9 when the pin is engaged in locking position. Projecting arms 7 are pivotally secured by a pivot pin at 11 and forced outwardly by coiled springs 10 which are seated in sockets 12 which are sufficiently deep to cause springs 10 to act as springs throughout their length and to prevent said springs from escaping from the pin. Facing sides 13 of the locking members and 14 of the leveling head are flat and engage in substantially parallel face-to-face relationship with structural elements 4.

If desired, locking members 6 and projections 8 can be beveled, i.e., have outwardly inclined converging lines, and their surfaces can be rounded both longitudinally and laterally. Such rounding of the locking members prevents snagging the edges of the bolt holes in the sheet elements when the pin is withdrawn from a locking position.

Figure 1:
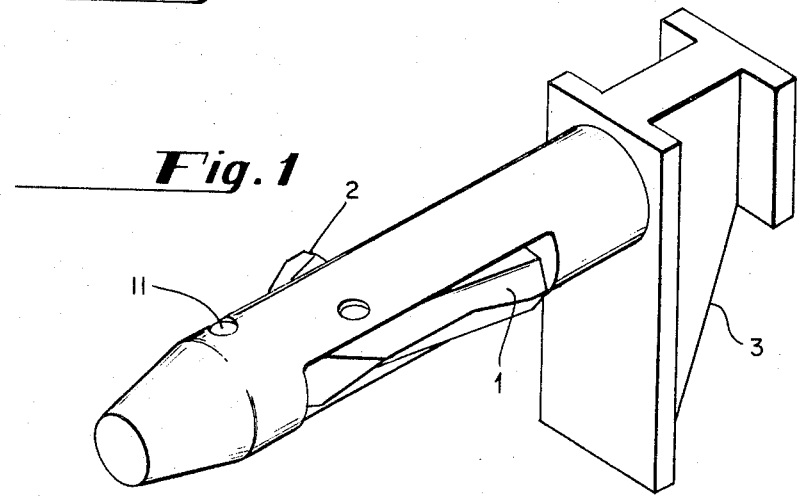
FIG. 1 is a perspective view of a leveling and self-locking pin in accordance with and embodying this invention.

It can readily be seen from FIG. 1 that the combined leveling and locking functions of, respectively, head 3 and locking-member 1 serve to hold the first structural element safely in place while additional structural elements are passed over locking-member 2.

What is claimed is:

1. In a detachable, leveling and self-locking pin for aligning and fastening together apertured structural elements, the combination of
   1. a body portion.
   2. a head extending from said body portion at a right angle therefrom and having face-to-face presentation with the said adjacent structural elements being fastened together, and
   3. at least two locking-members extending from recesses at the base of longitudinal slots disposed in series in longitudinally spaced-apart relationship on opposite sides of the said body portion which said locking-members are individually spring-actuated by separate spring means acting between said pin body portion and said locking members and have forwardly tapered body-portions pivotally mounted to said pin body portion, arms confined to said transverse recesses which engage the end-walls of the same, shoulders at the forward ends of said arms to extend laterally over the thickness of said end-walls, and main projections forwardly of said shoulders having flat rear surfaces for presentation to the face of the said adjacent structural element.

* * * * *